No. 649,804. Patented May 15, 1900.
F. BURGER & H. M. WILLIAMS.
CONVERTIBLE CAR.
(Application filed Mar. 3, 1898.)
(No Model.) 2 Sheets—Sheet 1.
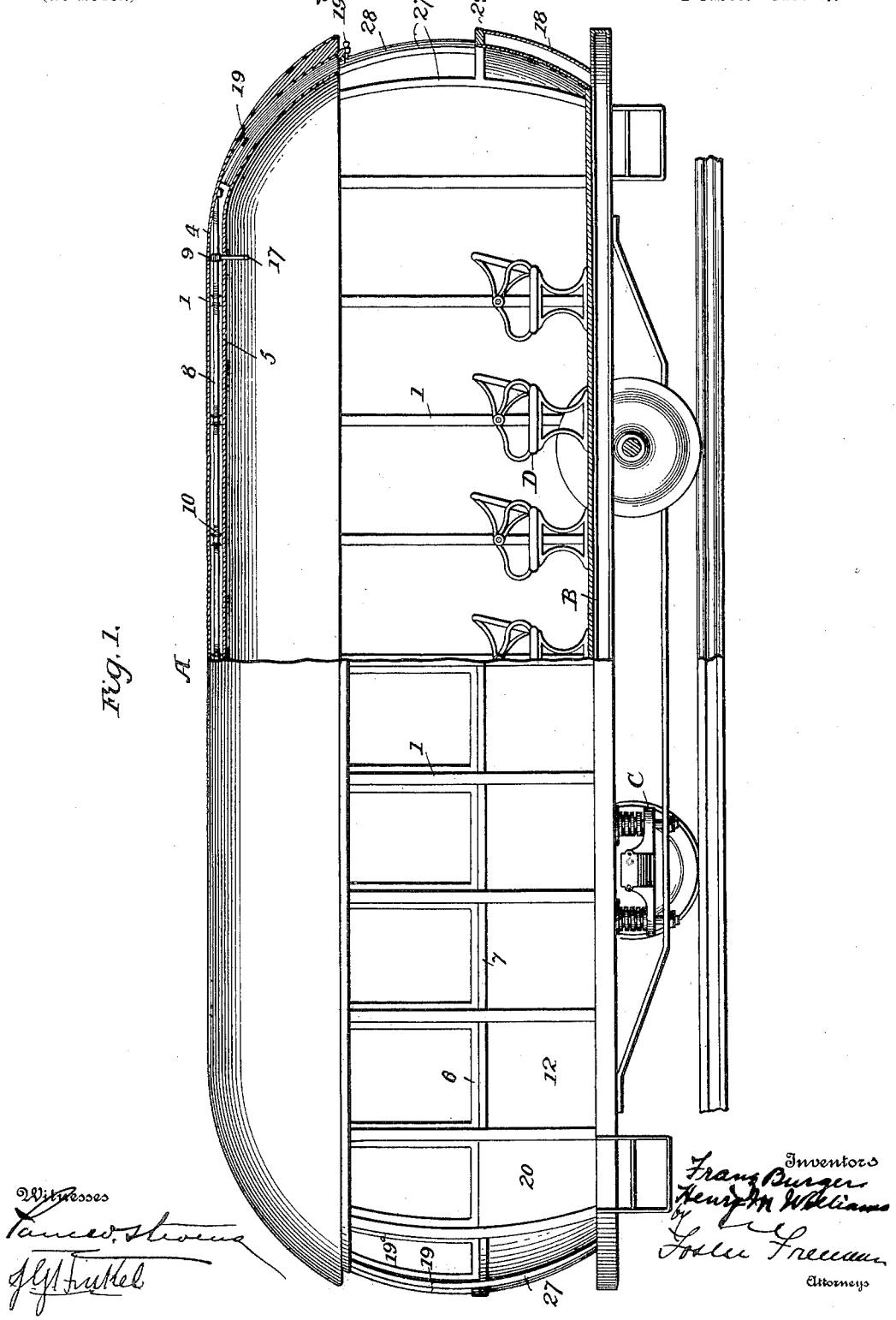

No. 649,804. Patented May 15, 1900.
F. BURGER & H. M. WILLIAMS.
CONVERTIBLE CAR.
(Application filed Mar. 3, 1898.)
(No Model.) 2 Sheets—Sheet 2.
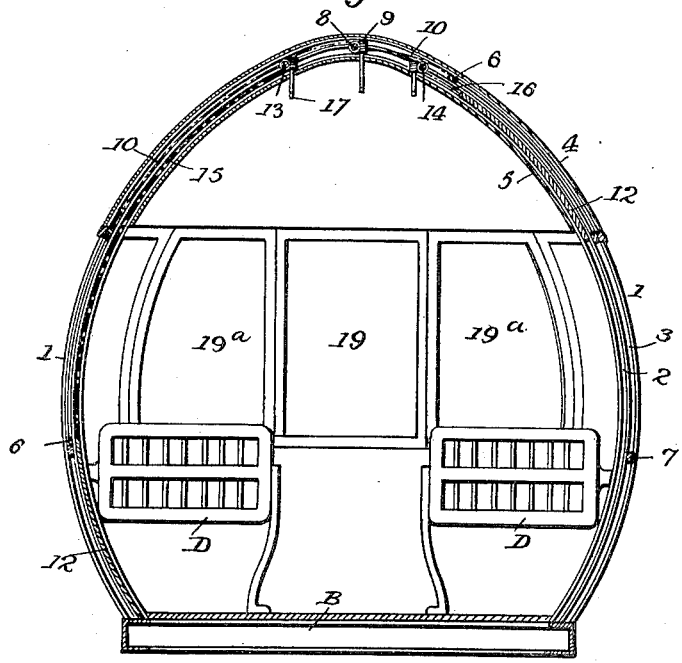
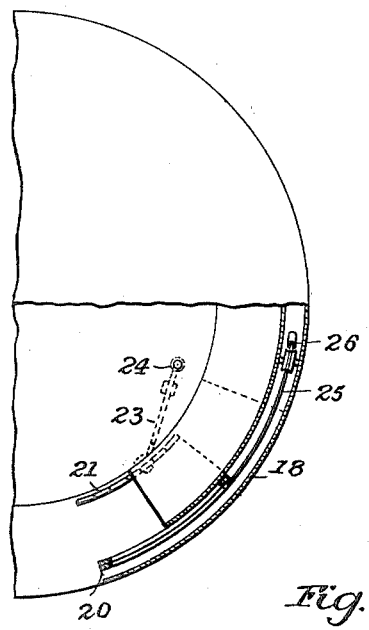
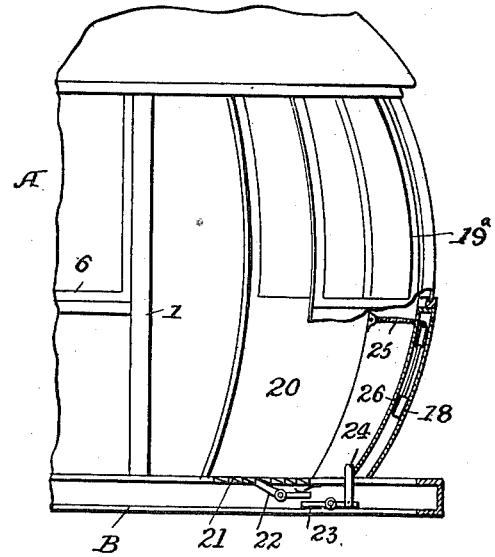
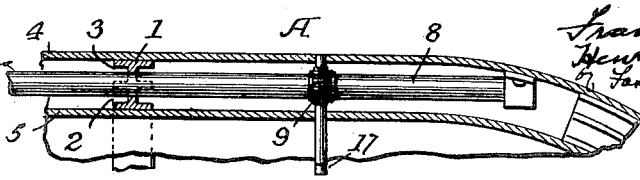

UNITED STATES PATENT OFFICE.

FRANZ BURGER AND HENRY M. WILLIAMS, OF FORT WAYNE, INDIANA; SAID BURGER ASSIGNOR OF ONE-HALF OF HIS RIGHT TO SAID WILLIAMS.

CONVERTIBLE CAR.

SPECIFICATION forming part of Letters Patent No. 649,804, dated May 15, 1900.

Application filed March 3, 1898. Serial No. 672,385. (No model.)

*To all whom it may concern:*

Be it known that we, FRANZ BURGER and HENRY M. WILLIAMS, citizens of the United States, residing at Fort Wayne, Allen county, Indiana, have invented certain new and useful Improvements in Convertible Cars, of which the following is a specification.

This invention relates to certain new and useful improvements in convertible cars for street and other railways, having for its object to provide a car which may be quickly and easily converted from an open to a closed car, and vice versa, accordingly as the varying conditions of the weather demand; and with this object in view the invention consists in the novel construction and arrangement hereinafter more particularly described.

In the accompanying drawings, forming a part of this specification, and in which like letters and numerals of reference indicate corresponding parts, Figure 1 is a part side elevation and part sectional view of a car constructed in accordance with the invention. Fig. 2 is a cross-sectional view thereof. Fig. 3 is a plan view, partly in section, of one end of the car. Fig. 4 is a vertical sectional view of the same, and Fig. 5 is a detail view.

Briefly stated, the invention comprises a car-body mounted upon suitable trucks, the said body being formed with convex sides, each of which conforms to an arc of a circle, the center of which is upon the opposite side of the vertical center of the car from said side. The sides of the car are made up of separated channeled bars which extend from the car-platform to the top of the car, and in these channels are arranged the side panels and window-sashes, which are adapted to be moved longitudinally therein to their lowered position when a closed car is desired and to be drawn upward therein and disposed between the walls of a double roof when an open car is required. The ends of the car are formed semispherical and, like the sides, are provided with movable window-sashes, which are received between the double walls of the roof when the car is open, and upon opposite sides the ends of the car are provided with convex doors which slide between double panels at said ends.

Referring more particularly to the drawings, A designates a car embodying the invention, comprising the usual platform B, truck C, and seats D, which may be of any suitable or desired construction. Extending from separated points throughout the length of the car are parallel frame-bars 1, each of which is provided in its edges with two parallel grooves or channels 2 3. These bars rise from the edges of the platform B and are curved upwardly, the degree of curvature being greater than that of an arc of a circle the center of which is at the transverse center of the car—that is to say, the bars at each side are curved to conform, or substantially so, to the arc of a circle the center of which is at the opposite side of the transverse center of the car to the bars. As thus constructed passengers may sit close to the sides of the car without inconvenience, and the cars may be employed upon parallel tracks between which there is very little space. The side bars upon opposite sides of the car may be connected together at the top of the car in any suitable manner, but preferably they are formed of a single continuous bar bent centrally of its length, and upon the upper end of the said bars is supported the roof of the car, comprising an outer wall 4 and an inner wall 5, the said walls being secured to the outer and inner faces of the bars, respectively.

Within the channels 3 of the side bars 1 are adapted to slide the window-sashes 6, the curvature of which is the same as that of the bars. These window-sashes are adapted to be moved longitudinally within the channels 3 to positions between the walls 4 5 of the roof or to lowered positions, in which latter case they are supported upon sills 7, extending from one side bar 1 to the other. Any suitable devices may be employed for raising and lowering the sashes 6; but those which will now be described are simple and efficient and are preferred on this account. Extending longitudinally of the car at the top and between the walls of the roof thereof is a shaft 8, provided at one end with worm-teeth, with which engages a worm-screw 9 for rotating the shaft, and within the groove 3 of the side bars and connected at one end to the said shaft and at their opposite ends to the top edges of the sashes 6 are chains or cords 10.

It will be seen from this that if the worm-screw 9 be turned it will rotate the shaft 8, causing the chains or cords 10 to be wound or unwound therefrom, according to the direction in which the shaft is rotated, thereby raising or lowering the window-sashes. While it will of course be obvious that means may be employed for operating each window-sash independently or for operating all of the sashes upon one side of the car simultaneously but independently of those upon the opposite side, it is preferred to operate all of the sashes upon both sides of the car simultaneously, and accordingly the chains or cords of each sash are connected to the shaft 8, as shown.

Adapted to move longitudinally in the channels 2 of the side bars 1 are inflexible panels 12, which conform in curvature to the side bars. Normally these panels are disposed in the lower ends of their channels with their lower edges resting in contact with the platform B and constitute the closed non-transparent portions of the sides of the car. These panels 12, like the window-sashes, as hereinbefore stated, are also adapted to be elevated and disposed between the walls of the roof of the car, and as a convenient way of effecting this two shafts 13 14, extending longitudinally of the car intermediate the roof-walls, are provided, one of the shafts being adapted to operate the panels upon one side of the car and the other those upon the opposite side thereof. Connected to these shafts at one end are chains or cords 15 16, which extend through the channels 2 and are connected at their opposite ends to the upper edges of the panels. From this it will be obvious that when the panels are in their lowered positions and the shafts are rotated the chains or cords 15 16 will be wound upon the shafts and the panels will be drawn upwardly in the channels 2 to positions between the roof-walls. It will be apparent, too, that while the panels upon opposite sides of the car may be operated from a single shaft, as are the window-sashes, it is preferred to operate the panels upon each side of the car independently. As a convenient means of rotating the shafts 13 14 they are each provided near one end with worm-teeth, with which mesh worm-screws 17, suitably supported and extending through the inner wall of the roof to receive an operating-key at their ends.

As before stated, the ends of the car are substantially semispherical in contour, each of said ends being comprised of a front hollow wall 18, central and side window-sashes 19 19$^a$, two doors 20, and a hollow roof. The wall 18 is stationary, and the doors 20, one of which is arranged upon each side of the car ends, are adapted to slide into the chambers of the wall when in their open position. These doors, it will be noted, are curved both with respect to length and width; but as they conform in curvature to the curvature of other portions of the end of the car it will be obvious that they may be freely opened and closed. At their lower edges the doors are provided with curved racks 21, with the teeth of which is adapted to engage a pawl 22, pivoted centrally below the car-platform and adapted to be engaged and operated by one end of a lever 23. This lever is likewise pivoted beneath the car-platform, and at its end it is connected to a short vertical rod 24, which extends through the platform within easy reach of the foot of the conductor or motorman. Connected to the rear edges of the doors are cables 25, which pass over pulleys journaled in the chambers of the walls 18, and provided at their ends with weights 26, likewise disposed within said chambers. Assuming now the doors to be in their closed positions, it will be obvious that if a rod 24 be depressed the pawl 22 will be disengaged from the rack through the lever 23, and the weight 26 will then pull upon the cable 25 and open the door.

The walls 18 are connected to the roof by curved uprights 27, provided in their sides with channels 28, in which slide the window-sashes 19 and 19$^a$. The central sashes 19 are adapted to slide upwardly and be retained in position between the walls of the roof by a suitable catch 19$^b$, as indicated in Fig. 1, and when in their lowered position said sashes rest upon sills 29. The side sashes 19$^a$ when the car is open slide in the channels 28 and are disposed in the hollow walls 18 out of the path of movement of the doors 20, and when elevated said sashes are held in position by suitable catches. (Not shown.)

Without limiting ourselves to the exact construction and arrangement of the parts shown and described, since it will be obvious that such construction and arrangement may be varied without departing from the spirit or scope of the invention and some of the features thereof used without others,

What we claim is—

1. In a convertible car, the combination with a wheeled platform, of side bars secured thereto, each of which is the segment of a true circle extending from the platform to the top of the car and the center of the circle is beyond the vertical center of the car, a hollow roof upon the upper portion of the bars, and a solid and a transparent sliding section between the adjacent bars, each being the segment of a circle corresponding with the circle of the bars, and means for sliding said sections.

2. In a convertible car, the combination with a wheeled platform, of curved side bars secured thereto, a double roof on the side bars, a solid and a transparent section between the adjacent bars, a central and two side shafts and means for connecting the transparent sections upon both sides to the central shaft and for connecting the solid sections upon each side with their respective shafts.

3. In a convertible car, the combination with a wheeled platform, of side bars secured thereto, a double roof on the side bars, a solid and a transparent section between the adjacent bars, a central and two side shafts, each of which is provided with a worm-pinion, a worm-gear for engaging therewith, and cords for connecting the transparent sections on both sides with the central shaft and the solid sections upon each side with their respective shafts.

4. In a convertible car, the combination with curved sides and a curved roof, of curved ends, two curved doors at each end, one upon each side, the bottom of each of which is provided with a curved rack, a pawl for each rack, a lever for the pawl, one end of which is provided with a rod projecting through the platform, and a weight for each door to open it when the pawl is released.

5. In a convertible car, the combination with curved sides and a curved roof, of curved ends, each of which comprises two doors, two sashes and a central portion, means for sliding the sash into the roof, and means for sliding the doors toward the central portion.

In testimony whereof we have signed our names to this specification in the presence of two subscribing witnesses.

FRANZ BURGER.
    HENRY M. WILLIAMS.

Witnesses:
 GEO. D. CRANE,
 J. BURGER.